United States Patent
Potz et al.

[11] Patent Number: 5,522,550
[45] Date of Patent: Jun. 4, 1996

[54] INJECTION NOZZLE FOR INTERNAL COMBUSTION ENGINES

[75] Inventors: Detlev Potz, Stuttgart; Guenter Lewentz, Hemmingen; Uwe Gordon, Markgröningen, all of Germany

[73] Assignee: Robert Bosch GmbH, Stuttgart, Germany

[21] Appl. No.: 351,394
[22] PCT Filed: May 21, 1993
[86] PCT No.: PCT/DE93/00447
§ 371 Date: Dec. 12, 1994
§ 102(e) Date: Dec. 12, 1994
[87] PCT Pub. No.: WO93/25814
PCT Pub. Date: Dec. 23, 1993

[30] Foreign Application Priority Data

Jun. 10, 1992 [DE] Germany .......... 42 18 980.2
Aug. 26, 1992 [DE] Germany .......... 42 28 359.0

[51] Int. Cl.⁶ .................................. F02M 61/08
[52] U.S. Cl. .................... 239/533.9; 239/533.12
[58] Field of Search ............ 239/585.1–585.5, 239/456–460, 533.3–533.12

[56] References Cited

U.S. PATENT DOCUMENTS

| | | | |
|---|---|---|---|
| 2,183,284 | 12/1939 | Weibicke | 239/460 |
| 2,263,197 | 11/1941 | Tabb et al. | 239/460 X |
| 4,982,708 | 1/1991 | Stutzenberger | 239/533.12 X |
| 5,127,584 | 7/1992 | Sczomak | 239/533.12 X |

FOREIGN PATENT DOCUMENTS

| | | | |
|---|---|---|---|
| 1511449 | 9/1989 | U.S.S.R. | 239/585.4 |
| 2132268 | 7/1984 | United Kingdom | 239/533.12 |

*Primary Examiner*—Kevin Weldon
*Attorney, Agent, or Firm*—Edwin E. Greigg; Ronald E. Greigg

[57] ABSTRACT

A fuel injection nozzle for internal combustion engines has a nozzle body and an outward-opening valve needle with a closing head. To produce tightly focused injection streams, the closing head has, in addition to a valve cone that cooperates with a valve seat on the nozzle body, a piston acted upon by fuel, with a jacket cut away by means of a recess and pierced by openings. The discharge orifice of the openings is axially offset from the valve cone, so that the injection cross sections, which are elongated and axially parallel, are not opened up by a control edge on the valve seat until after an idle stroke. A relief groove between the valve cone and the piston of the closing head assures a defined contact of the valve cone with the valve seat.

22 Claims, 3 Drawing Sheets

INJECTION NOZZLE FOR INTERNAL COMBUSTION ENGINES

BACKGROUND OF THE INVENTION

The invention is based on a fuel injection nozzle for internal combustion engines as generically defined hereinafter. In an injection nozzle of this type, known from German Offenlegungsschrift DE-OS 40 06 488, the valve needle has a plurality of axially parallel longitudinal grooves in the circumference of the piston embodied as a collar, which extend downstream from the face end of the piston that defines the pressure chamber to the valve cone of the piston. When the valve needle opens, the region of the longitudinal grooves near the valve cone is uncovered progressively as an injection cross section; the resultant flow vector is always defined by the shortest path from the inlet of the longitudinal groove to the injection cross section. Since the longitudinal grooves extend axially parallel as far as the injection cross section, a strongly axial directional component is imparted to the injection stream; orientation at a predetermined cone angle adapted to the engine combustion chamber is not possible.

A precise alignment of the injection streams at a predetermined cone angle is present in a fuel injection nozzle according to European Patent Disclosure EP-A-209 244, in which the injection direction is determined by injection ports that pierce the shaft of the hollow-drilled valve needle at an obtuse cone angle near the valve cone. Flaring open or breathing of the hollow valve needle at high pressures can cause problems with respect to reliable function in this embodiment of the valve needle. Moreover, the axial bore in the shaft of the valve needle is a hindrance to miniaturizing the injection nozzle.

ADVANTAGES OF THE INVENTION

The fuel injection nozzle according to the invention has an advantage that injection streams with a tightly focused stream profile and a constant flow angle are formed, as is needed for a direct injection internal combustion engine. Moreover, the offset disposition of the openings relative to the sealing face of the closing head assures that tightly focused injection streams are not formed until after an idle valve needle stroke is traversed at low fuel feed pressure, or low engine speed; such streams assure good fuel preparation. Moreover, an unthrottled inflow to the beginning of the openings is assured by the relatively large cross section that is feasible for the recess on the face end of the piston of the closing head toward the pressure chamber.

By the provisions recited herein advantageous further features of and improvements to the fuel injection nozzle disclosed are possible. The piston of the valve needles in are provided with a particularly low-throttling flow of the fuel to the openings and through them to the injection ports. As a result, very high efficiency in the conversion of pressure into speed is attained. By the alignment of the openings an injection profile of the kind with multi-port nozzles is attained. The injection characteristic is favorably affected by means set forth herein. An embodiment set forth herein assures a defined contact of the sealing face of the closing head with the valve seat of the nozzle body which is especially advantageous. A satisfactory, defined contact of the valve cone with the nozzle body valve seat in the form of the linear seat is attained by the construction set forth.

DRAWING

Two exemplary embodiments of the invention are shown in the drawing and will be described in detail below. FIG. 1 is longitudinal section of an injection nozzle; FIGS. 2 and 3 show the end portion A toward the combustion chamber in the first exemplary embodiment of the injection nozzle of FIG. 1 in cross section and on a larger scale, in the closed and open position, respectively; FIG. 4 shows the end portion A toward the combustion chamber of the second exemplary embodiment, on a larger scale and in cross section; and FIGS. 5a–5d shows shapes of grooves of the second exemplary embodiment of FIG. 4 in a simplified side view.

DESCRIPTION OF THE EXEMPLARY EMBODIMENT

Figure 1:
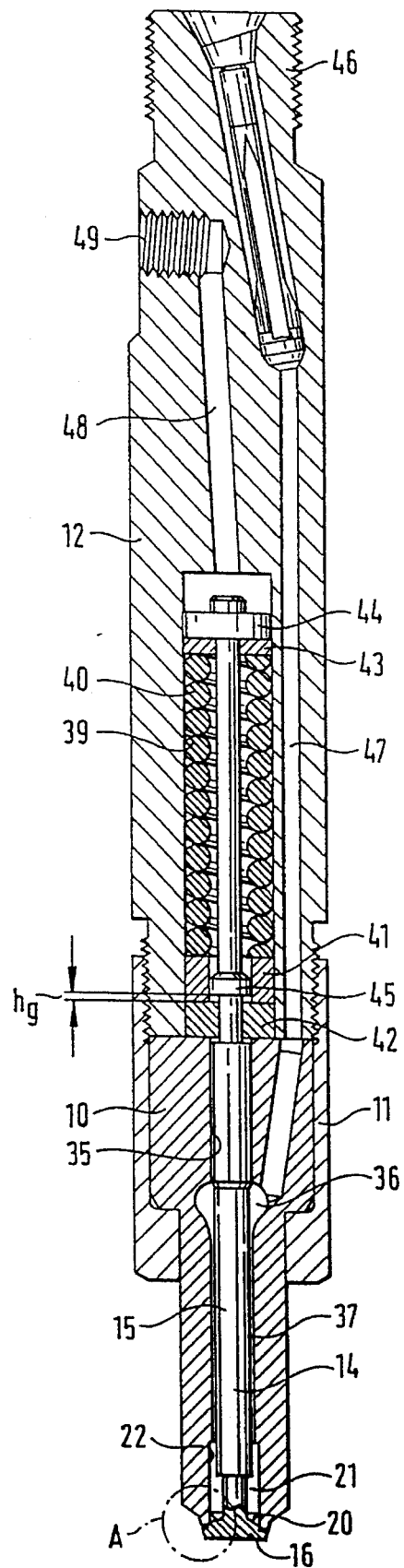

The injection nozzle has a nozzle body 10, which is firmly fastened to a nozzle holder 12 by means of a union nut 11. A valve needle 15, which on its end toward the combustion chamber has a closing head 16, is displaceably supported in the nozzle body 10. The closing head, on a shoulder, has a valve cone 17 that cooperates with a conical valve seat 18 on the nozzle body 10. The angle of the valve seat 18 is somewhat less or preferably greater than the angle of the valve cone 17 on the closing head 16, so that the valve needle 15 rests with its valve cone 17 in a circular line, as a sealing seat on the valve seat 18 of the nozzle body 10. Radially offset from the valve cone 17, the closing head 16 has a piston 20, which is guided in the nozzle body 10 in a cylinder bore 22 that forms a pressure chamber 21. At the transition of the valve cone 17 to the piston 20, there is a rounded relief groove 23, which assures a satisfactory, defined contact of the valve cone 17 with the valve seat 18. Preferably, a narrow radial annular face 19 of the shoulder connects the valve cone 17 to the relief groove 23.

On its face end toward the pressure chamber 21, the piston 20 has an annular recess 25, embodied as an undercut, surrounding the shaft 14 of the valve needle 15 and limited radially on the outside by a jacket 26 of the piston 20. The outer wall face 27, limited by the jacket 26, of the recess 25 is conical and has an angle of inclination of 40° to 50°, preferably, so that the recess 25 opens wide toward the pressure chamber 21. The jacket 26 of the piston 20 is pierced by a plurality of openings, for instance four in number, which define the injection cross section. In the exemplary embodiment of FIGS. 2 and 3, the openings are embodied as holes 30, which begin at the bottom 24 of the recess 25 and discharge when an outlet end is exposed at a predetermined distance above the valve cone 17 of the closing head 16. The holes 30 extend radially obliquely to the center axis of the valve needle 15, preferably at an angle that is equal to the cone angle of the valve seat 18 of the nozzle body 10 and of the valve cone 17 of the closing head 16, or to the requisite injection angle of the injection streams. The injection holes or ports 30 may have a cylindrical cross section; preferably, they have a cross section that is elongated parallel to the center axis of the valve needle 15, for example the cross section of a flat oval or of a rectangle. Depending on the desired course of the opening cross section, any closed curve course can be achieved. The cross section may be designed to be narrower at the bottom near the valve cone 17 than above it.

Figure 2:
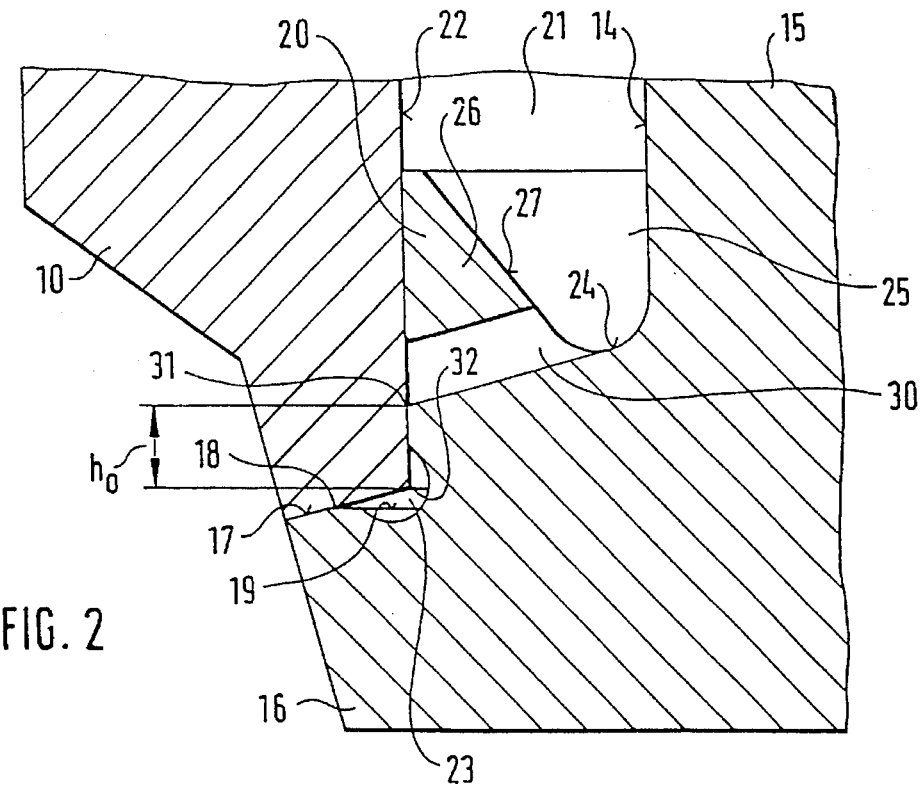
Figure 3:
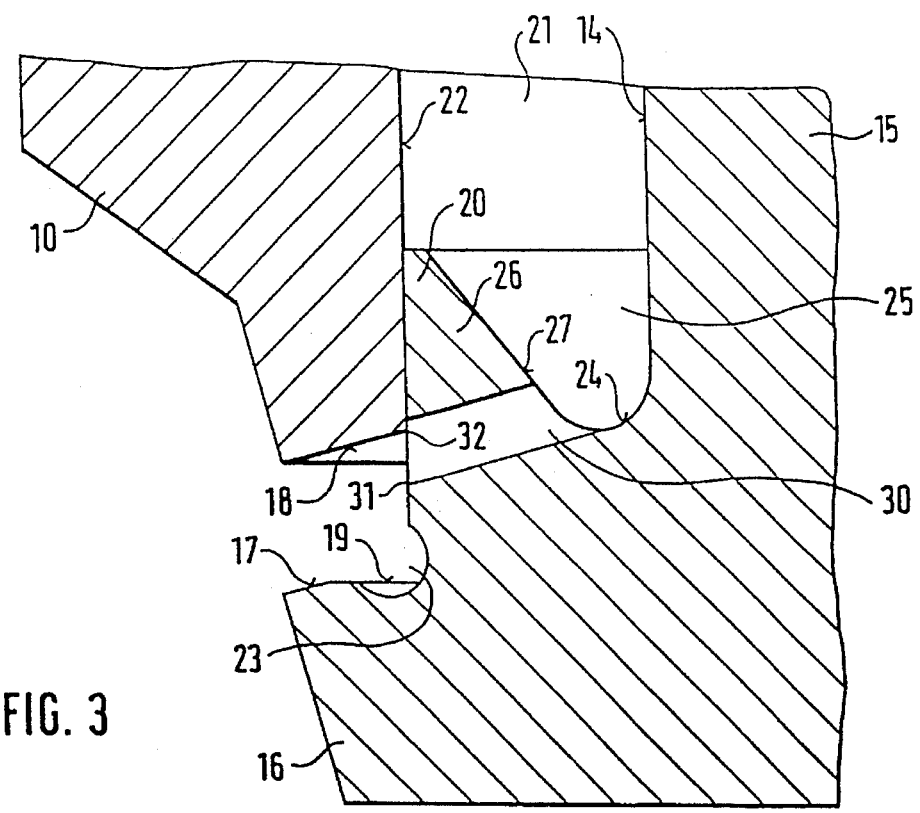
Figure 4:
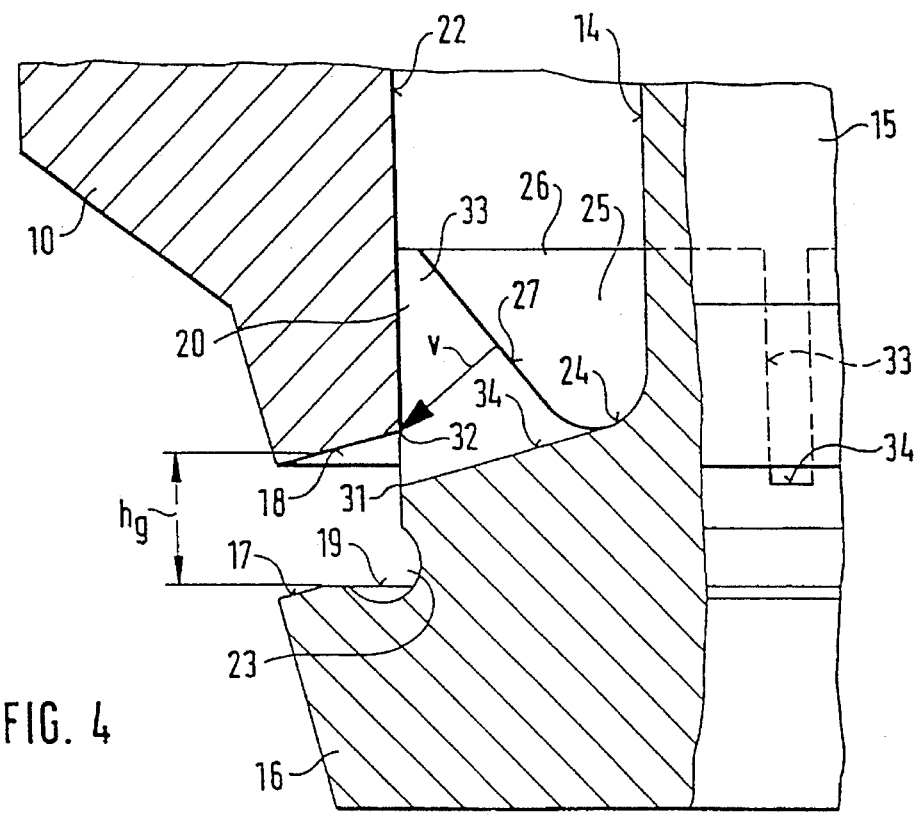
Figures 5A, 5B, 5C, 5D:
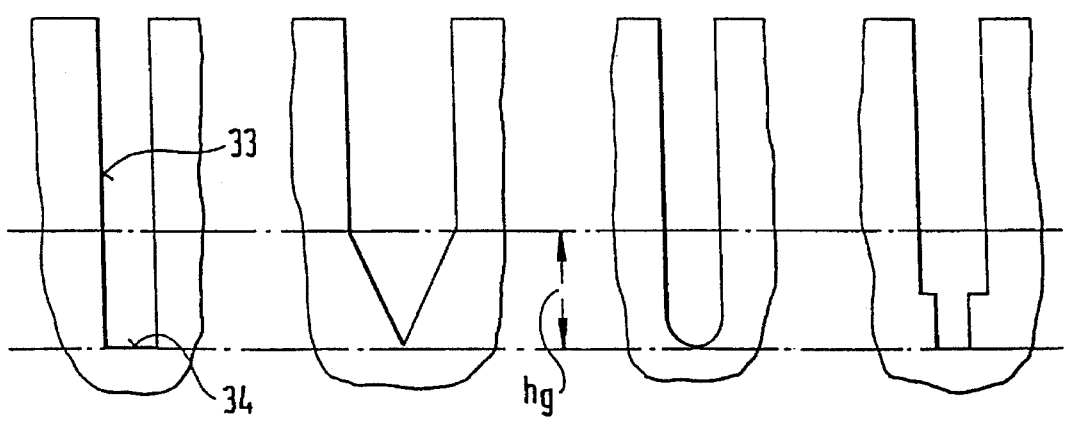

In the exemplary embodiment of FIG. 4, which is embodied essentially like that of FIGS. 1–3, the openings that form the injection cross sections alternatively have the form of narrow grooves 33 that pierce the jacket 26 of the piston 20 from its face end as far as the bottom 24 of the recess 25. Similarly to the axis of the holes 30, the bottom 34 of these grooves 33 extends radially obliquely to the center axis of the valve needle 15. For the most part, the cross section of the grooves 33 is rectangular; to form a predetermined cross sectional characteristic of the injection streams as a function of the stroke hg of the valve needle 15, the cross section, at least in the region of the discharge orifice at the circumference of the jacket 26, as FIGS. 5a–5d show, is uniformly wide (a) from the bottom 34, or widens triangularly (b), or is curved (c) or is stepped (d), so that upon the initial stroke of the valve needle 15, a fine injection stream is formed at first, and as the stroke continues a compact injection stream is formed. The discharge orifices of the holes of the exemplary embodiment of FIGS. 2 and 3 may be embodied in the same way as well.

In the closing position of the valve needle 15, the lower edge 31 of the discharge orifice of the holes 30 or of the grooves 33 may have a certain spacing $h_o$ from the valve seat 18 in the nozzle body 10, so that on its opening stroke the valve needle 15 first executes an idle stroke before the discharge orifice cross section of the holes 30 or grooves 33 is uncovered and progressively opened by a control edge 32 at the transition from the valve seat 18 to the cylinder bore 22 (FIGS. 3 and 4).

The valve needle 15 is displacably supported in a guide bore 35 in the nozzle body 10; this bore 35 is adjoined downstream by a collecting chamber 36 and an annular gap 37 that connects this chamber to the pressure chamber 21. The valve needle 15 is pulled with its closing head 16 toward the valve seat 18 on the nozzle body 10 by a closing spring 40, which is disposed in a spring chamber 39 in the nozzle holder 12. The closing spring 40 is supported on the nozzle body 10 via a spacer bush 41 and a slotted stop disk 42, and via a compensation disk 43 it presses against a support ring 44 secured to the end of the valve needle 15. To limit the total stroke hg of the valve needle 15, the shaft 14 of the valve needle 15 is offset at the level of the stop disk 42, forming a stop collar 45, which is spaced apart by the distance hg from the stop disk 42 in the closing position of the valve needle.

An inflow conduit 47 that begins at a connection neck 46 in the nozzle holder 12 and in the nozzle body 10 leads to the collection chamber 36. An oil leakage conduit 48 also connects the spring chamber 39 to a connection 49.

The injection nozzle described functions as follows:

In the intervals between injections, the closing spring 40 presses the valve needle 15 with the valve cone 17 of the closing head 16 against the valve seat 18 on the nozzle body 10; the discharge orifice of the injection ports 30 or grooves 33 is covered by the wall of the nozzle body 10 surrounding the cylinder bore 22, and the sealing cone 17 rests tightly against the valve seat 18 (FIG. 2). When fuel is supplied under pressure through the inflow conduit 47 into the collecting chamber 36 and from there through the annular gap 37 into the pressure chamber 21, a pressure builds up in the pressure chamber that acts upon the piston 20 of the closing head 16, so that the valve needle 15 is displaced in the flow direction, counter to the action of the closing spring 50. Once an idle stroke $h_o$ has been traversed, which is determined by the distance between the lower edge 31 of the holes 30 or grooves 33 and the theoretical line of intersection of the valve cone 17 with the jacket 26 of the piston 20, the lower edge 31 of the injection ports 30 or grooves 33 is thrust across the control edge 32 and, controlled by the needle stroke, increasingly uncovers a defined injection cross section. The needle stroke and injection cross section each results from the equilibrium between the force of the closing spring 40 and the hydraulic force at the piston 20. Through the injection cross section being uncovered at the discharge orifice of the injection ports 30 or grooves 33, fuel in the form of focused injection streams flows into the engine combustion chamber at a predetermined cone angle, as it does in multi-port nozzles. In the exemplary embodiment of FIGS. 2 and 3, the course of the longitudinal axis of the ports 30 determines the injection direction. In the exemplary embodiment of FIG. 4, because the flow always takes the shortest path between the beginning and the discharge orifice of the grooves 33, the result is a flow vector v, represented as an arrow, that points toward the outlet cross section and is inclined relative to the bottom 34 of the grooves 33. Since the injection ports 30 or grooves 33 each represent one flow conduit, which tapers from the entry to the injection cross section, the injection pressure is converted into speed with little loss, and the effect of an extremely short injection port with high nozzle efficiency is attained. By shaping the cross section of the ports 30 or grooves 33 as a rectangle, triangle or oval, and other curve courses are also conceivable, various cross-sectional opening courses are impressed upon the injection nozzle. In this way, preferably in combination with the characteristic of the closing spring 40 and the pump rate of the injection pump, the course of injection over time can be influenced for attaining optimal engine combustion. Because of the aforementioned equilibrium condition, the optimal injection cross section for fuel preparation at any given time is always established.

When the pressure of the pumped fuel decreases, the closing spring 40 pulls the valve needle 15 back again; initially, the injection ports 30 or grooves 33 are closed, and then the valve cone 17 of the closing head 16 tightly closes off the valve seat 18 again.

In addition it may be pointed out that the longitudinal axis of the injection ports 30 is aligned in the desired injection direction of the injection stream, and the angle of inclination of the valve seat 18 and valve cone 17 is designed to correspond to this angle of alignment.

The foregoing relates to preferred exemplary embodiments of the invention, it being understood that other variants and embodiments thereof are possible within the spirit and scope of the invention, the latter being defined by the appended claims.

We claim:

1. A fuel injection nozzle for an internal combustion engine, having a combustion chamber, a nozzle body, a pressure chamber (21) in said nozzle body that communicates with a fuel inflow conduit (47), a valve seat on said nozzle body on an end toward the combustion chamber, having a valve needle (15), a closing head on an end of said valve needle toward the combustion chamber that cooperates with the valve seat on the nozzle body and which opens outwardly of the valve seat, said valve needle has an offset piston axially defining the pressure chamber and said closing head is acted upon by fuel, a closing spring that tenses the valve needle with a sealing face of the closing head against the valve seat counter to the fuel flow, injection ports in the piston of the valve needle that are controllable as a function of the needle stroke, the piston (20) has a recess (25) that opens axially upstream toward the pressure chamber (21) and is limited radially by a jacket (26), the injection ports pierce the jacket (26) and are offset axially from the sealing face (17) of the closing head (16) in a direction toward the pressure chamber (21), and the injection portions have an outlet that discharges from the circumference of the jacket (26).

2. A fuel injection nozzle as defined by claim 1, in which the recess (25) in the piston (20) is wide open toward the pressure chamber (21), and that the injection ports extend as far as the bottom (24) of the recess (25).

3. A fuel injection nozzle as defined by claim 1, in which the axes of the injection ports (30) extend in said jacket which is formed as an obtuse conical jacket.

4. A fuel injection nozzle as defined by claim 2, in which the axes of the injection ports (30) extend in said jacket which is formed as an obtuse conical jacket.

5. A fuel injection nozzle as defined by claim 1, in which the injection ports have an elongated cross section that extends parallel to a center axis of the valve needle (15).

6. A fuel injection nozzle as defined by claim 2, in which the injection ports have an elongated cross section that extends parallel to a center axis of the valve needle (15).

7. A fuel injection nozzle as defined by claim 3, in which the injection ports have an elongated cross section that extends parallel to a center axis of the valve needle (15).

8. A fuel injection nozzle as defined by claim 4, in which the injection ports have an elongated cross section that extends parallel to a center axis of the valve needle (15).

9. A fuel injection nozzle as defined by claim 5, in which a cross section of the injection ports widens from the bottom to a face end of the piston (20).

10. A fuel injection nozzle as defined by claim 9, in which a cross section of the injection ports has a form of a rectangle.

11. A fuel injection nozzle as defined by claim 1, in which the injection ports are embodied as holes (30) that pierce the jacket (26) of the piston (20).

12. A fuel injection nozzle as defined by claim 2, in which the injection ports are embodied as holes (30) that pierce the jacket (26) of the piston (20).

13. A fuel injection nozzle as defined by claim 3, in which the injection ports are embodied as holes (30) that pierce the jacket (26) of the piston (20).

14. A fuel injection nozzle as defined by claim 5, in which the injection ports are embodied as holes (30) that pierce the jacket (26) of the piston (20).

15. A fuel injection nozzle as defined by claim 9, in which the injection ports are embodied as holes (30) that pierce the jacket (26) of the piston (20).

16. A fuel injection nozzle as defined by claim 10, in which the injection ports are embodied as holes (30) that pierce the jacket (26) of the piston (20).

17. A fuel injection nozzle as defined by claim 1, in which the injection ports are embodied as grooves (33) that pierce the jacket (26) of the piston (20) from a direction of a face end.

18. A fuel injection nozzle as defined by claim 2, in which the injection ports are embodied as grooves (33) that pierce the jacket (26) of the piston (20) from a direction of a face end.

19. A relief groove (23) is disposed at a transition between the sealing face (17) and the piston (10) of the closing head (16).

20. A fuel injection nozzle as defined by claim 1, in which an annular face (19), whose tone angle is more obtuse than that of the sealing face (17), is disposed between the sealing face (17) of the closing head (16) and a relief groove (23).

21. A fuel injection nozzle as defined by claim 9, in which a cross section of the injection ports has a form of a triangle.

22. A fuel injection nozzle as defined by claim 9, in which a cross section of the injection ports has a form of a oval.

* * * * *